US008696503B2

(12) United States Patent
Oishi et al.

(10) Patent No.: US 8,696,503 B2
(45) Date of Patent: Apr. 15, 2014

(54) BICYCLE SPROCKET ASSEMBLY

(75) Inventors: Toshinari Oishi, Osaka (JP); Koji Tokuyama, Osaka (JP); Keisuke Hyogo, Osaka (JP)

(73) Assignee: Shimano Inc., Osaka (JP)

( * ) Notice: Subject to any disclaimer, the term of this patent is extended or adjusted under 35 U.S.C. 154(b) by 345 days.

(21) Appl. No.: 13/037,403

(22) Filed: Mar. 1, 2011

(65) Prior Publication Data

US 2012/0225745 A1 Sep. 6, 2012

(51) Int. Cl.
*F16H 55/12* (2006.01)
*F16H 55/30* (2006.01)

(52) U.S. Cl.
USPC .......... 474/160

(58) Field of Classification Search
USPC .......... 474/160, 164
See application file for complete search history.

(56) References Cited

U.S. PATENT DOCUMENTS

| | | | | |
|---|---|---|---|---|
| 3,478,614 | A * | 11/1969 | Shimano | 474/160 |
| 3,772,932 | A * | 11/1973 | Nagano | 474/160 |
| 4,089,231 | A * | 5/1978 | Segawa | 474/160 |
| 5,480,357 | A * | 1/1996 | Liang | 474/77 |
| 5,503,600 | A * | 4/1996 | Berecz | 474/160 |
| 5,935,034 | A * | 8/1999 | Campagnolo | 474/160 |
| 6,039,665 | A | 3/2000 | Nakamura | |
| 6,102,821 | A * | 8/2000 | Nakamura | 474/160 |
| 6,176,798 | B1 * | 1/2001 | Nakamura | 474/160 |
| 6,264,575 | B1 * | 7/2001 | Lim et al. | 474/77 |
| 6,923,741 | B2 * | 8/2005 | Wei | 474/160 |
| 7,344,463 | B2 * | 3/2008 | Reiter | 474/160 |
| 7,435,197 | B2 * | 10/2008 | Kamada | 474/152 |
| 7,585,240 | B2 * | 9/2009 | Kamada | 474/160 |
| 7,854,673 | B2 * | 12/2010 | Oseto et al. | 474/82 |
| 7,871,347 | B2 * | 1/2011 | Kamada | 474/160 |
| 2004/0070166 | A1 * | 4/2004 | Valle | 280/260 |
| 2004/0121867 | A1 * | 6/2004 | Reiter | 474/160 |
| 2004/0142782 | A1 * | 7/2004 | Kamada et al. | 474/160 |
| 2006/0172840 | A1 * | 8/2006 | Kamada | 474/152 |
| 2006/0258499 | A1 * | 11/2006 | Kamada | 474/160 |
| 2007/0054770 | A1 * | 3/2007 | Valle | 474/160 |

(Continued)

FOREIGN PATENT DOCUMENTS

| | | | |
|---|---|---|---|
| EP | 1 074 462 | A2 | 2/2001 |
| TW | 492460 | U | 6/2002 |

OTHER PUBLICATIONS

European Search Report of corresponding EP Application No. 11 19 1252.3 dated Mar. 20, 2012.

*Primary Examiner* — William A Rivera
*Assistant Examiner* — Henry Liu
(74) *Attorney, Agent, or Firm* — Global IP Counselors

(57) ABSTRACT

A bicycle sprocket assembly is provided with at least a first sprocket, a second sprocket and a first axial spacer. The first sprocket includes an outermost peripheral portion defining a plurality of first teeth, and an innermost peripheral portion defining an opening that is free of any freewheel engaging splines. The first sprocket is larger than any other sprocket of the bicycle sprocket assembly. The second sprocket includes an outermost peripheral portion defining a plurality of second teeth, and an innermost peripheral portion defining an opening having a plurality of freewheel engaging splines. The first axial spacer is fixed to the first and second sprockets such that the first axial spacer is disposed between the first and second sprockets without any intervening sprockets disposed between the first and second sprockets. The first axial spacer includes an innermost peripheral portion defining an opening having a plurality of freewheel engaging splines.

13 Claims, 11 Drawing Sheets

(56) References Cited

U.S. PATENT DOCUMENTS

| | | | | |
|---|---|---|---|---|
| 2007/0060428 | A1* | 3/2007 | Meggiolan | 474/160 |
| 2008/0004143 | A1* | 1/2008 | Kanehisa et al. | 474/160 |
| 2008/0188336 | A1* | 8/2008 | Tokuyama | 474/160 |
| 2008/0289927 | A1* | 11/2008 | Ji | 192/64 |
| 2009/0042681 | A1 | 2/2009 | Dal Pra' et al. | |
| 2009/0069135 | A1* | 3/2009 | Chiang | 474/164 |
| 2009/0098966 | A1* | 4/2009 | Kamada | 474/160 |
| 2010/0009794 | A1 | 1/2010 | Chiang | |

* cited by examiner 44
11
40
42
48
21
46
48
12
54
64
50
70
78
22
52
72
60
80
13a
13b
13c
62
88
13
82
84
14
23
13d
15
16
17
24
18
25
26
19
20
27
C

BICYCLE SPROCKET ASSEMBLY

BACKGROUND OF THE INVENTION

1. Field of the Invention

This invention generally relates to a rear sprocket assembly for a bicycle. More specifically, the present invention relates a rear sprocket assembly in which more sprockets can be mounted to a freewheel of a bicycle hub assembly than a conventional rear sprocket assembly having all of the sprockets directly contacting the freewheel.

2. Background Information

In recent years, bicycle component manufacturers have been manufacturing bicycle transmissions that have more available speeds to the rider. As the available speeds in the bicycle transmission increases, the number of sprockets installed on the rear wheel also usually increases. While sprockets can be made thinner, a minimum spacing between adjacent sprockets is required to accommodate the chain. Moreover, a rear end of a conventional bicycle frame only has a limited amount of space for mounting the wheel and a rear sprocket assembly. Thus, there is a desire to increase the number of gears without changing the dimensions of the conventional bicycle frame. Accordingly, various attempts have been made in order to increase the maximum number of sprocket that can be installed on a rear hub assembly. For example, some multiple sprocket assemblies use a spider (sprocket support), which supports a plurality of ring-shaped sprocket wheels. By using a spider, a light metal such as aluminum, etc., is generally used for the spider, while various types of steel materials are used for the sprockets to provide adequate strength. One example of a multiple sprocket assembly that uses a spider is disclosed in U.S. Pat. No. 6,039,665 (assigned to Shimano Inc.),

SUMMARY

One object of the present invention is to provide a bicycle sprocket assembly that allows more sprockets to be mounted to a conventional speed freewheel. For example, in the present disclosure, an embodiment is illustrated that shows ten sprockets can be mounted to a conventional nine speed freewheel.

The foregoing objects can basically be attained by providing a bicycle sprocket assembly that at least comprises a first sprocket, a second sprocket and a first axial spacer. The first sprocket includes an outermost peripheral portion defining a plurality of first teeth, and an innermost peripheral portion defining an opening that is free of any freewheel engaging splines. The first sprocket is larger than any other sprocket of the bicycle sprocket assembly. The second sprocket includes an outermost peripheral portion defining a plurality of second teeth, and an innermost peripheral portion defining an opening having a plurality of freewheel engaging splines. The first axial spacer is fixed to the first and second sprockets such that the first axial spacer is disposed between the first and second sprockets without any intervening sprockets disposed between the first and second sprockets. The first axial spacer includes an innermost peripheral portion defining an opening having a plurality of freewheel engaging splines.

These and other objects, features, aspects and advantages of the disclosed bicycle sprocket assembly will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
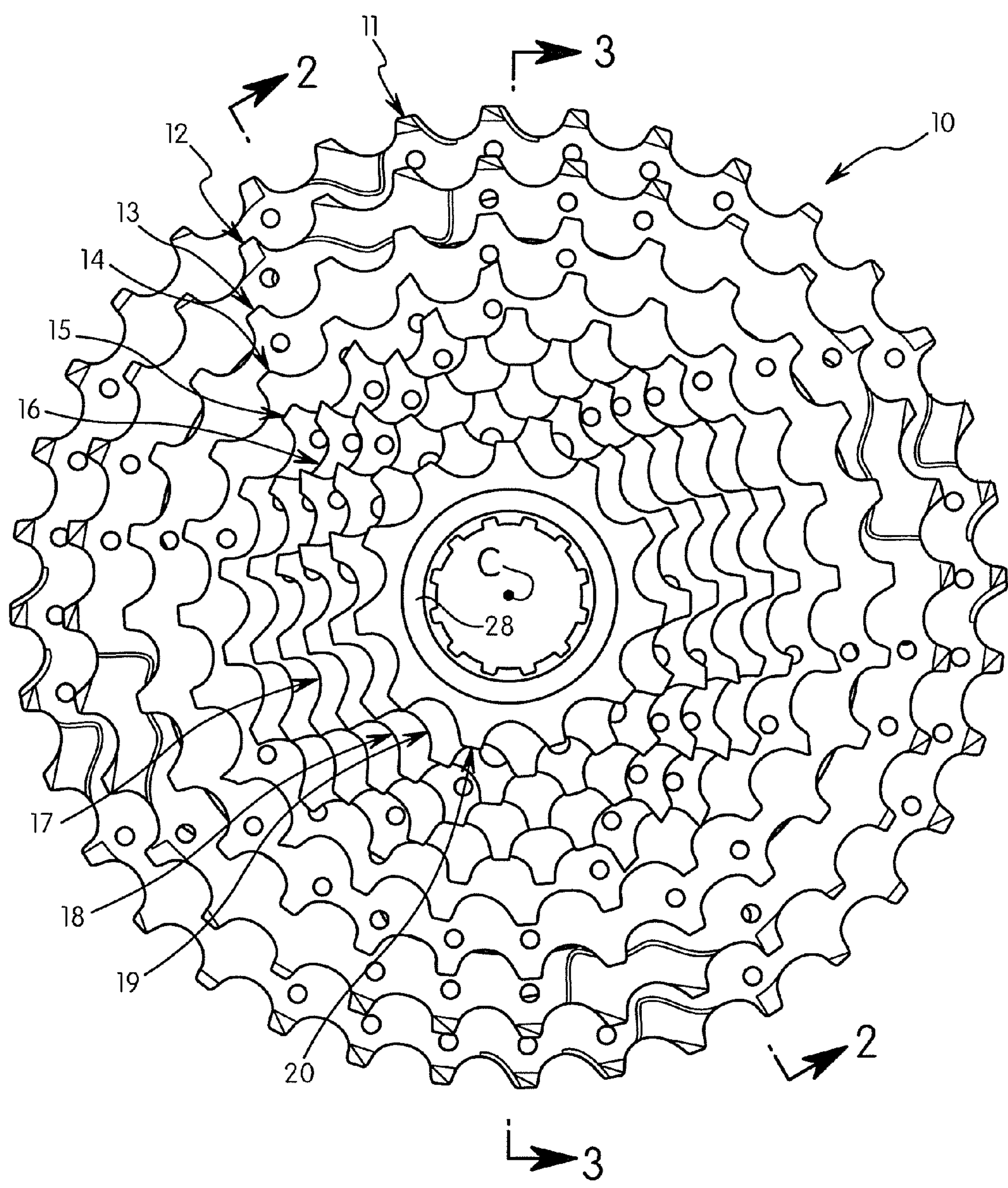
FIG. 1 is a side elevational view of a ten-stage bicycle sprocket assembly in accordance with one illustrated embodiment.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 4, a rear multi-stage bicycle sprocket assembly 10 is illustrated in accordance with a first embodiment. In the illustrated embodiment, the bicycle sprocket assembly 10 includes a plurality of sprockets 11 to 20. In the illustrated embodiment, for example, the sprockets 11 to 20 have the teeth configuration from the largest sprocket 11 to the smallest sprocket 20 as follows: 36T-32T-28T-24T-21T-19T-17T-15T-13T-11T. Of course, the bicycle sprocket assembly 10 is not limited to this particular teeth configuration. As seen in FIGS. 1 to 4, the sprockets 11 to 20 are hard, rigid disc shaped members formed from a suitable material such as a metallic material. In the illustrated embodiment, the sprockets 11 to 20 are each formed as a one-piece, unitary member from a metallic material that is suitable for a bicycle sprocket such as an iron or an iron alloy. The sprockets 11 and 12 provided with various shift aiding structures that aid in performing an upshifting operation from a larger diameter sprocket to a smaller diameter sprocket and/or a downshifting operation from a smaller diameter sprocket to a larger diameter sprocket. On the other hand, the sprockets 13 to 20 are illustrated as plain sprockets. However, the configuration of the sprockets 11 to 20 can have any configuration as needed and/or desired.

The sprockets 11 to 20 are configured and arranged to be fixedly mounted on a conventional nine-speed freewheel (not shown) of a rear hub (not shown) in a relatively conventional manner. In this way, the sprockets 11 to 20 rotate together about a center rotational axis C. The sprockets 11 to 20 typically rotate together in a clockwise direction as viewed in FIG. 1 (e.g., in a forward rotational direction) when the rider is pedaling in a forward (clockwise) direction to propel the bicycle in a forward direction.

For the sake of clarity, the sprockets 11 to 20 will be referred to as first, second, third, fourth, fifth, sixth, seventh eighth, ninth and tenth sprockets, respectively. The first sprocket 11 is the largest sprocket of the bicycle sprocket assembly 10 with a largest maximum diameter in the bicycle sprocket assembly 10. On the other hand, the tenth sprocket 20 is the smallest sprocket of the bicycle sprocket assembly 10 with a smallest maximum diameter in the bicycle sprocket assembly 10. In this disclosure, the third, fourth, fifth, sixth, seventh, eighth, ninth and tenth sprockets 13 to 20 are additional sprockets that are smaller than the first and second sprockets 11 and 12, which are the two largest sprockets of the bicycle sprocket assembly 10. Moreover, each of the sprockets 11 to 20 has a first sprocket side surface and a second sprocket side surface. In the illustrated embodiment, the first sprocket side surface refers to the sprocket side that faces towards the smaller sprocket(s), while the second sprocket side surface refers to the sprocket side that faces towards the larger sprocket(s).

Figure 2:
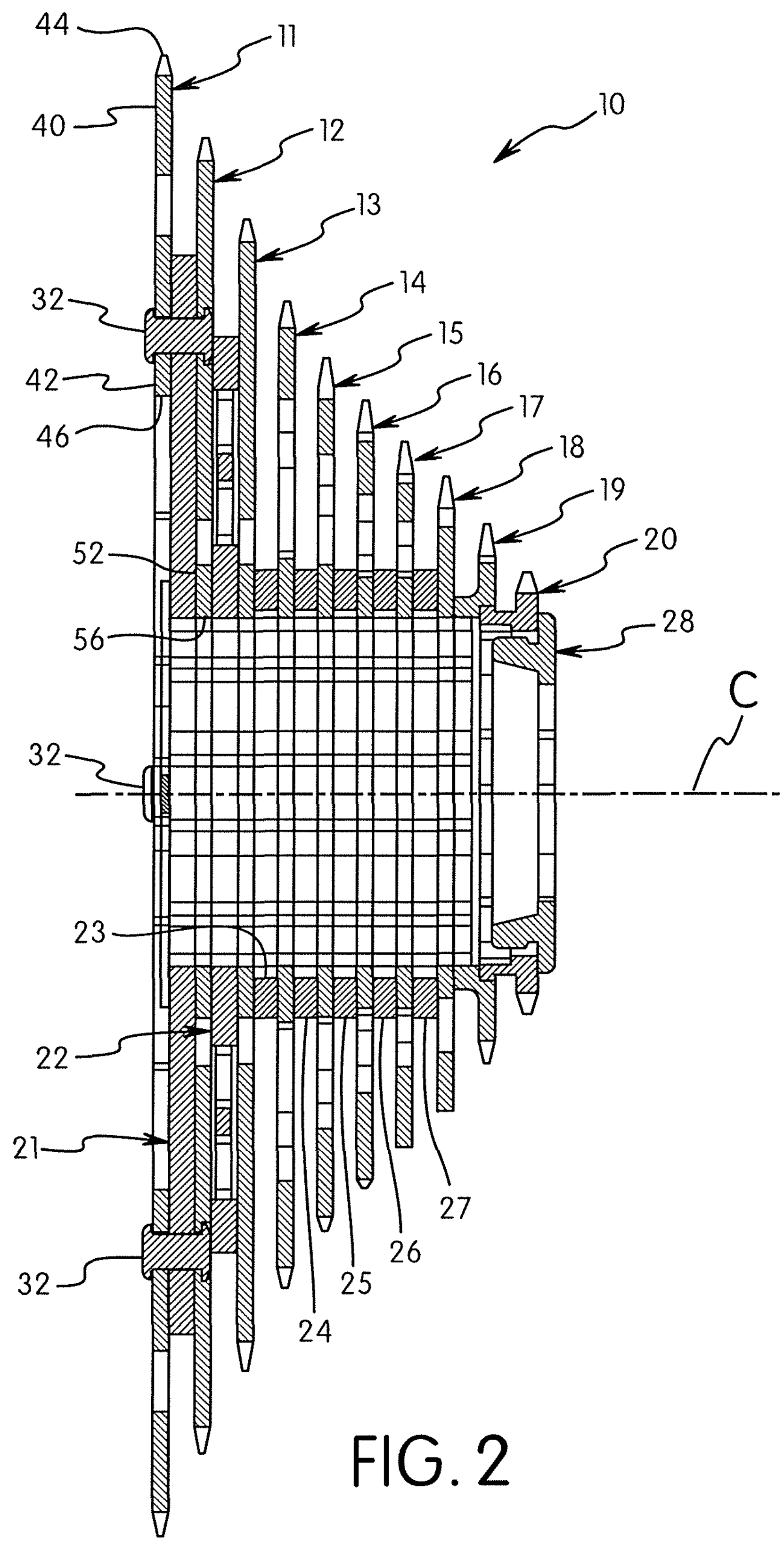
FIG. 2 is a cross sectional view of the bicycle sprocket assembly as seen along section line 2-2 of FIG. 1.
Figure 3:
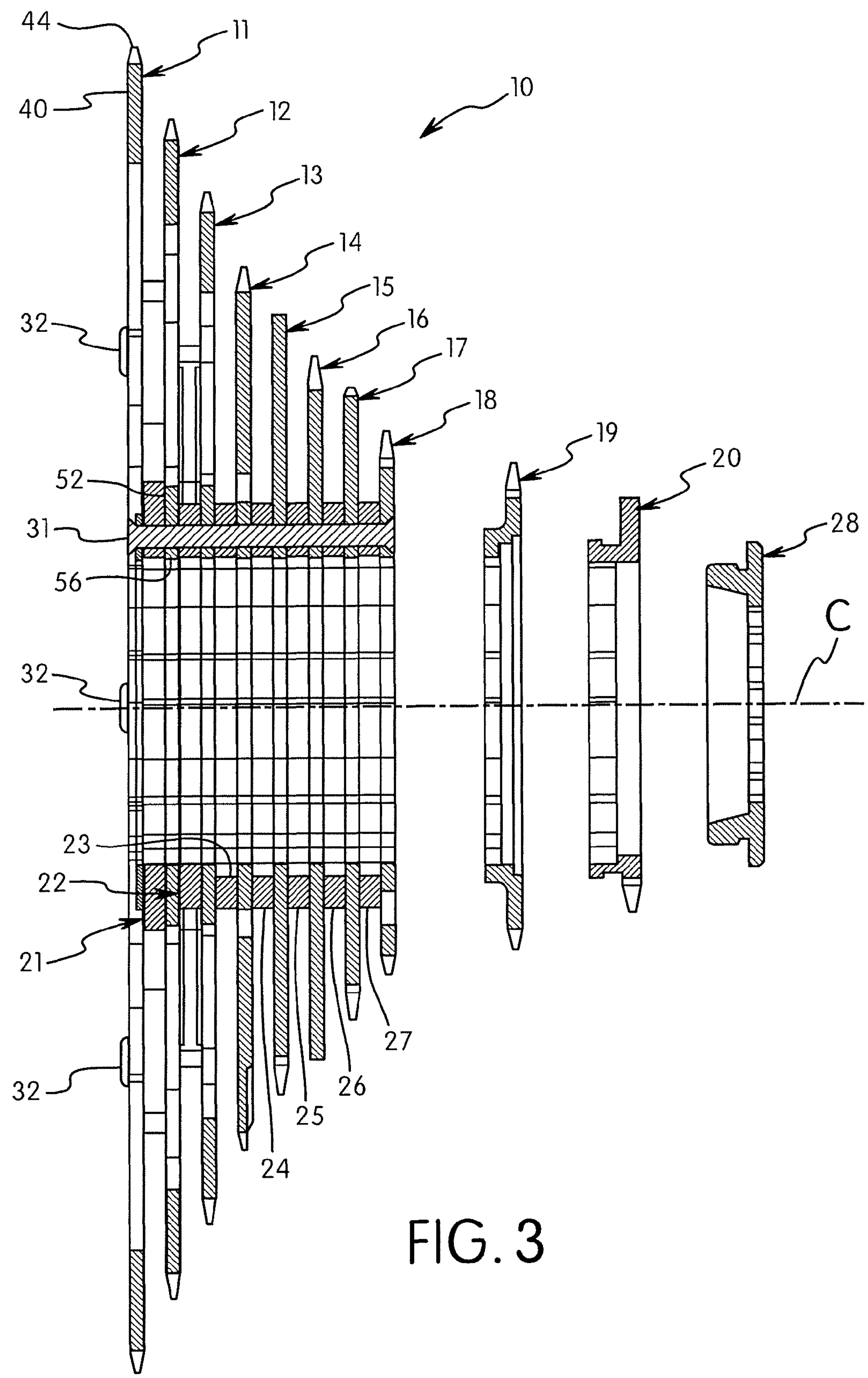
FIG. 3 is a partially exploded cross sectional view of the bicycle sprocket assembly as seen along section line 3-3 of FIG. 1.
Figure 4:
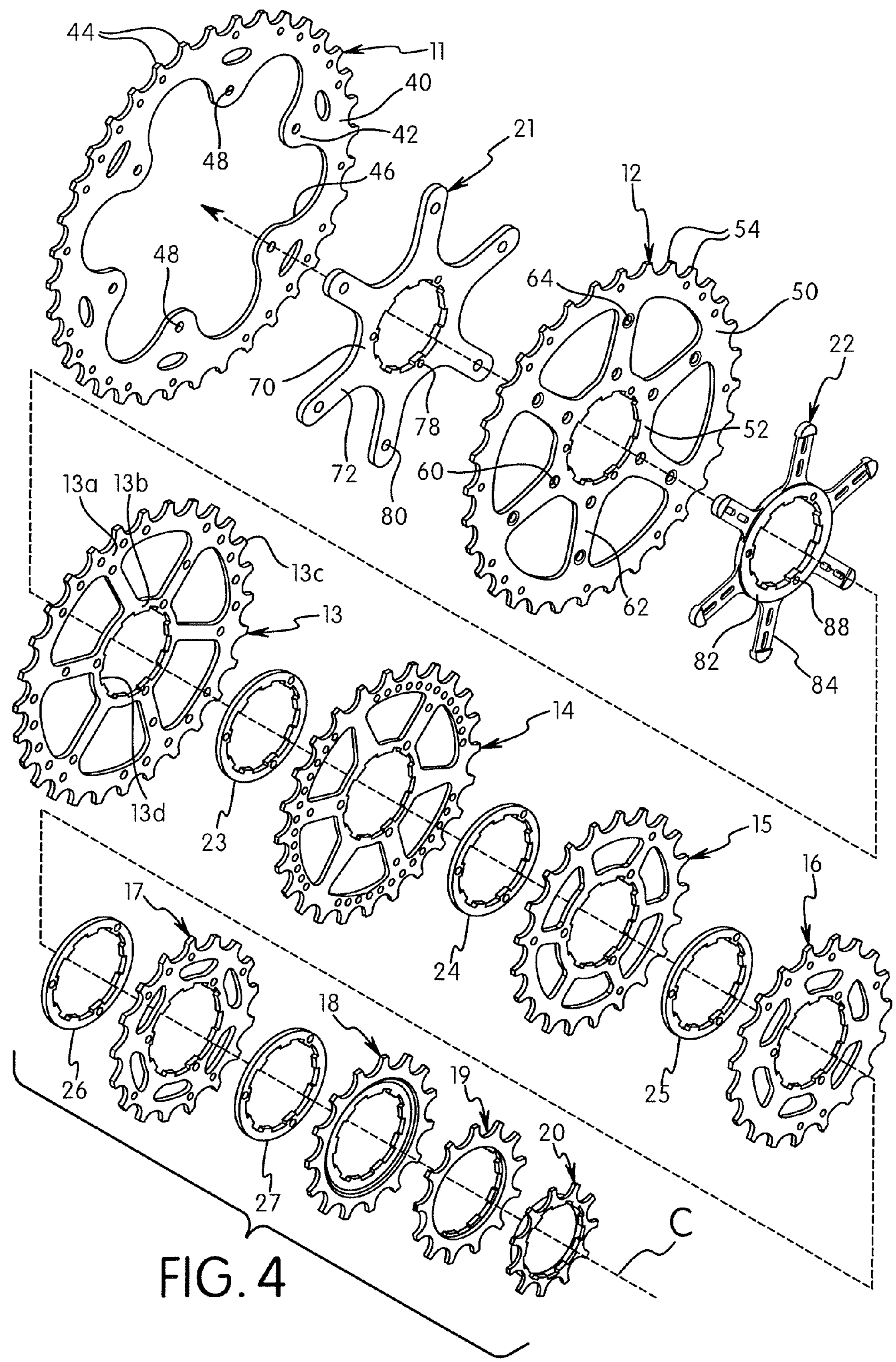
FIG. 4 is an exploded perspective view of the bicycle sprocket assembly illustrated in FIGS. 1 to 3 as viewed from the small sprocket facing side of the sprockets.

As seen in FIGS. 2 to 4, in the illustrated embodiment, the bicycle sprocket assembly 10 further includes a plurality of axial spacers 21 to 27 for axially spacing the sprockets 11 to 18 and a locking ring 28 for attaching the bicycle sprocket assembly 10 to a freewheel in a conventional manner. Thus, the sprockets 11 to 18 are axially spaced from each other at predetermined intervals by the thickness of the axial spacers 21 to 27.

The axial thicknesses of the sprockets 11 to 20 and the axial spacings between the sprockets 11 to 20 will vary depending on the particular the drive train design. As seen in FIG. 2, for example, the sprocket bodies of the first to ninth sprockets 11 to 19 each have a thickness of about 1.6 millimeters, while the sprocket body of the tenth sprockets 20 has a thickness of about 2.0 millimeters. Also for example, the axial spacers 21 to 27 each have a thickness of about 2.35 millimeters. The eighth to tenth sprockets 18 to 20 are spaced about 2.35 millimeters apart by the integrated spacers of the ninth and tenth sprockets 19 and 20.

As seen in FIG. 4, the axial spacers 21 to 27 are each a one-piece, unitary member that is made of a suitable rigid and/or lightweight materials. For example, the axial spacers 21 to 27 can be made of rigid resin materials or lightweight metallic materials such as aluminum. Preferably, the axial spacers 22 to 27 are made of a rigid resin material for the purpose of weight-saving, and the axial spacer 21 is made of iron for obtaining rigidity. For the sake of clarity, the axial spacers 21 to 27 will be referred to as first, second, third, fourth, fifth, sixth and seventh axial spacers, respectively. Since the axial spacers 23 to 27 are conventional, the axial spacers 23 to 27 will not be discussed in detail herein. Rather, the following disclosure will focus on the first and second axial spacers 21 and 22 and their cooperation with the first and second sprockets 11 and 12. Also since the sprockets 13 to 20 are conventional, the sprockets 13 to 20 will not be discussed in detail herein. Rather, the following disclosure will focus on the first and second sprockets 11 and 12.

As seen in FIGS. 2 and 3, the first axial spacer 21 is disposed between the first and second sprockets 11 and 12 for providing the appropriate axial spacing therebetween without any intervening sprockets disposed between the first and second sprockets 11 and 12. Thus, the first axial spacer 21 is disposed on the first sprocket side surface of the first sprocket 11, which faces the second sprocket 12, and is disposed on the second sprocket side surface of the second sprocket 12, which faces the first sprocket 11. The second axial spacer 22 is disposed between the second and third sprockets 12 and 13 for providing the appropriate axial spacing therebetween without any intervening sprockets disposed between the second and third sprockets 12 and 13. The third axial spacer 23 is disposed between the third and fourth sprockets 13 and 14 for providing the appropriate axial spacing therebetween. The fourth axial spacer 24 is disposed between the fourth and fifth sprockets 14 and 15 for providing the appropriate axial spacing therebetween. The fifth axial spacer 25 is disposed between the fifth and sixth sprockets 15 and 16 for providing the appropriate axial spacing therebetween. The sixth axial spacer 26 is disposed between the sixth and seventh sprockets 16 and 17 for providing the appropriate axial spacing therebetween. The seventh axial spacer 27 is disposed between the seventh and eighth sprockets 17 and 18 for providing the appropriate axial spacing therebetween. The ninth and tenth sprockets 19 and 20 both include an integrated spacer portion for axially spacing the eighth to tenth sprockets 18 to 20 at the appropriate axial spacing therebetween.

As best seen in FIGS. 2 and 3, in the illustrated embodiment, the bicycle sprocket assembly 10 further includes a plurality of radially inner rivets or fasteners 31 and a plurality of radially outer rivets or fasteners 32. The inner rivets 31 secure inner peripheral portions of the sprockets 12 to 18 together. More particularly, the inner rivets 31 extend through each of the sprockets 12 to 18, as discussed below. In this way, the sprockets 12 to 18 and all of the axial spacers 21 to 27 are fixed together by the inner rivets 31 (e.g., at least one common fastener) that does not fix the first sprocket 11 to the sprockets 12 to 18.

On the other hand, the outer rivets 32 only connect the first and second sprockets 11 and 12 together with the first axial spacer 21 disposed between the first and second sprockets 11 and 12, as discussed below. In this way, the first axial spacer 21 is fixed to the first and second sprockets 11 and 12 by the outer rivets 32 (e.g., at least one common fastener) that does not directly connect any other spacers or sprockets to the first and second sprockets 11 and 12. Accordingly, the first axial spacer 21 is fixed to the first and second sprockets 11 and 12 such that the first axial spacer 21 is disposed between the first and second sprockets 11 and 12 without any intervening sprockets disposed between the first and second sprockets 11 and 12.

In the illustrated embodiment, the first and second sprockets 11 and 12 are the two largest sprockets that are secured together by the outer rivets 32 at six outer attachment points.

On the other hand, the sprockets 13 to 18 are conventional sprockets and the axial spacers 23 to 27 are conventional ring shaped axial spacers that are secured together by the inner rivets 31 at three attachment points. As mentioned above, the inner rivets 31 are also secured to the second sprocket 12. Thus, the inner rivets 31 are not directly attached to the first sprocket 11.

Figure 5:
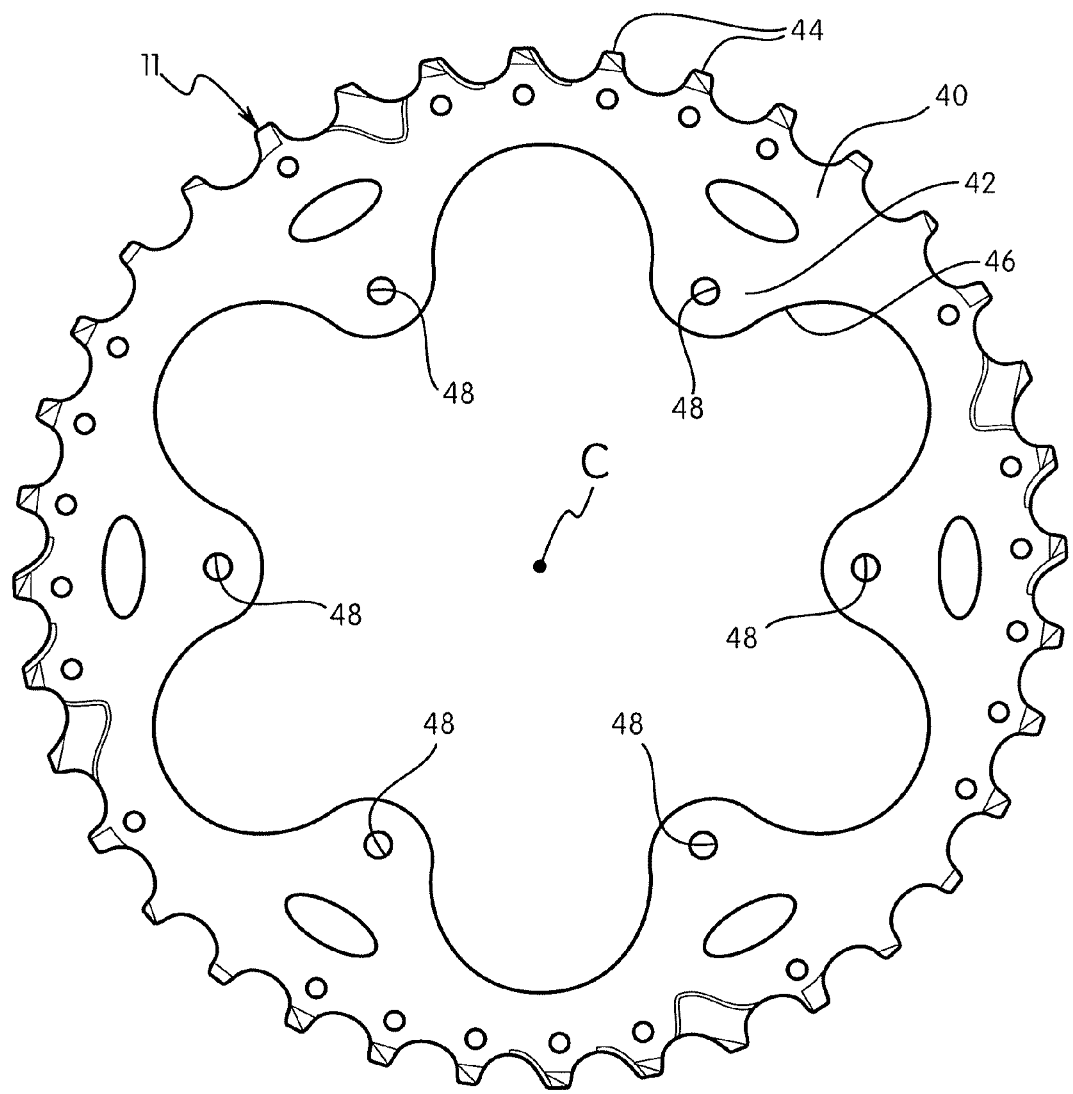
FIG. 5 is a side elevational view of the largest sprocket of the bicycle sprocket assembly illustrated in FIGS. 1 to 4 as viewed from the small sprocket facing side of the sprocket.

As best seen in FIG. 5, the first sprocket 11 includes an outermost peripheral portion 40 and an innermost peripheral portion 42. The first sprocket 11 is radially straight as the first sprocket 11 extends between the outermost peripheral portion 40 and the innermost peripheral portion 42. In other words, the first sprocket 11 is generally a flat plate with the first and second sprocket side surfaces being planar between the outermost peripheral portion 40 and the innermost peripheral portion 42 other than various holes and recesses. In the case of the first sprocket 11, the outermost peripheral portion 40 and the innermost peripheral portion 42 are preferably integrally formed as a one-piece, unitary member. The outermost peripheral portion 40 defines a plurality of first teeth 44. The first teeth 44 of the outermost peripheral portion 40 constitute a first chain engaging portion. The innermost peripheral portion 42 defines an opening 46 that is free of any freewheel engaging splines. The innermost peripheral portion 42 includes a plurality of fastener holes 48 for receiving the outer rivets 32. The innermost peripheral portion 42 constitutes a first sprocket mounting portion of the first sprocket 11. As mentioned above, the first sprocket 11 is larger than any other sprocket of the bicycle sprocket assembly 10. Since the first sprocket 11 is the largest sprocket of the bicycle sprocket assembly 10, the total number of the first teeth 44 is typically greater than the other sprockets 12 to 20 of the bicycle sprocket assembly 10. As mentioned above, the total number of the first teeth 44 in this illustrated embodiment is thirty-six.

Figure 6:
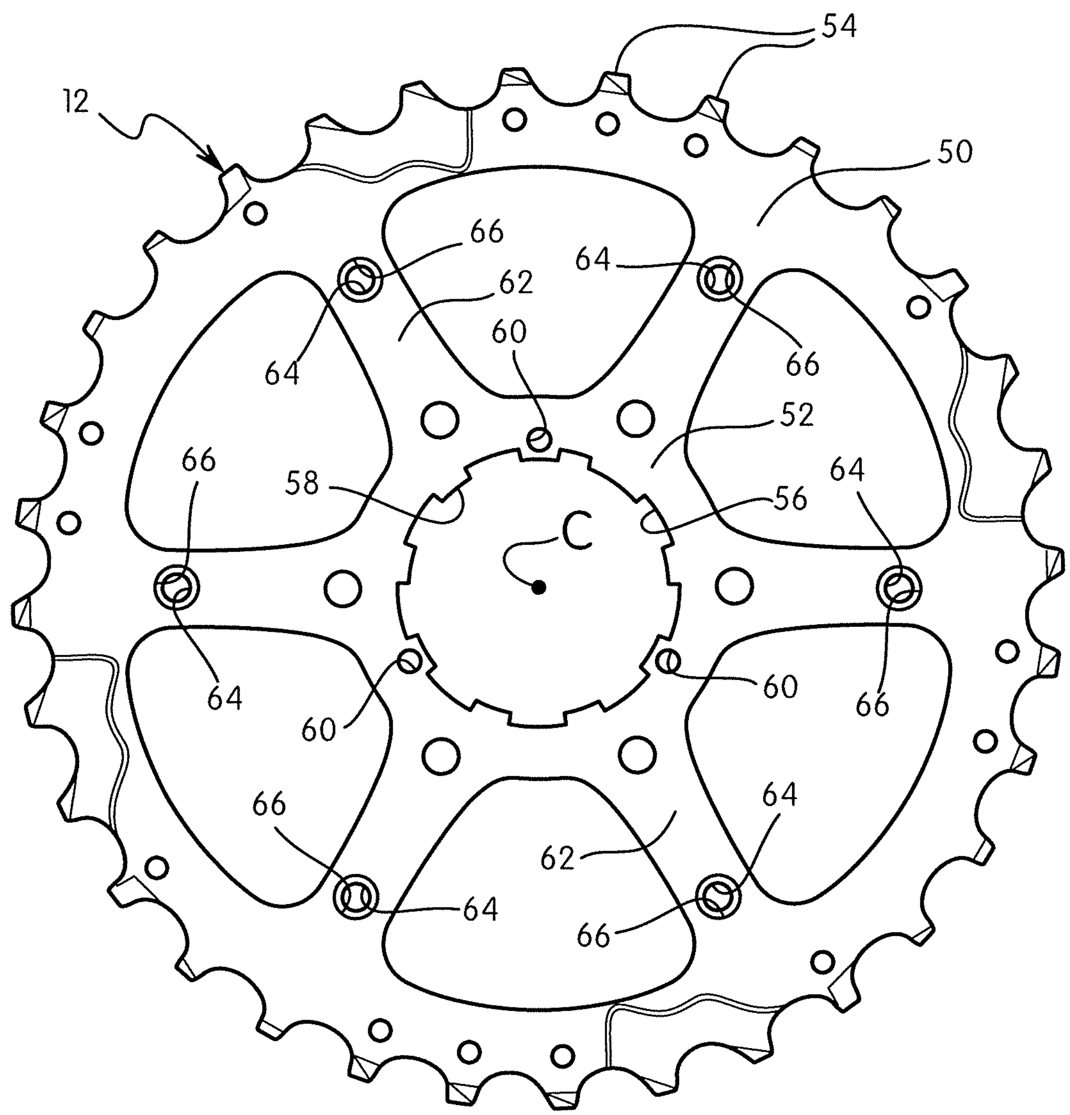
FIG. 6 is a side elevational view of the second sprocket (the sprocket next to the largest sprocket) of the bicycle sprocket assembly illustrated in FIGS. 1 to 4 as viewed from the small sprocket facing side of the sprocket.

As best seen in FIG. 6, the second sprocket 12 includes an outermost peripheral portion 50 and an innermost peripheral portion 52. The second sprocket 12 is radially straight as the second sprocket 12 extends between the outermost peripheral portion 50 and the innermost peripheral portion 52. In other words, the second sprocket 12 is generally a flat plate with the first and second sprocket side surfaces being planar between the outermost peripheral portion 50 and the innermost peripheral portion 52 other than various holes and recesses. The outermost peripheral portion 50 defines a plurality of second teeth 54. The second teeth 54 of the outermost peripheral portion 50 constitute a second chain engaging portion. As mentioned above, the total number of the second teeth 54 in this illustrated embodiment is thirty-two. The innermost peripheral portion 52 defines a splined opening 56 having a plurality of freewheel engaging splines 58. The splines 58 of the splined opening 56 are dimensioned to the non-rotatably engage splines of a conventional nine-speed freewheel (not shown) of a rear hub (not shown) in a relatively conventional manner. Preferably, the splined opening 56 is configured so that the second sprocket 12 can only fit on the freewheel (not shown in a single orientation. The splined opening 56 defines an inner periphery of the innermost peripheral portion 52. The innermost peripheral portion 52 also has a plurality of fastener holes 60 for receiving the inner rivets 31 therethrough, respectively.

In the illustrated embodiment, the outermost peripheral portion 50 is connected to the innermost peripheral portion 52 by a plurality of sprocket arms 62. In the case of the second sprocket 12, the sprocket arms 62 are preferably integrally formed with the outermost peripheral portion 50 and the innermost peripheral portion 52 as a one-piece, unitary member. Each of the sprocket arms 62 has a fastener hole 64 for receiving the outer rivets 32 therethrough, respectively. Each of the fastener holes 64 has a counter bore 66 so that the heads of the outer rivets 32 can be flush with the first sprocket side surface of the second sprocket 12 that faces towards the third sprocket 13. As mentioned above, the second sprocket 12 is the second largest sprocket of the bicycle sprocket assembly 10.

Referring back to FIG. 4, since the sprockets 13 to 20 are relatively conventional sprockets, the sprockets 13 to 20 will only be briefly discussed. Basically, the sprockets 13 to 20 are smaller than the first and second sprockets 11 and 12, with each of the sprockets 13 to 20 getting progressively smaller and progressively fewer teeth. Each of the sprockets 13 to 20 includes an outermost peripheral portion and an innermost peripheral portion. For example, the third sprocket 13 includes an outermost peripheral portion 13*a*, and an innermost peripheral portion 13*b*. Each of the outermost peripheral portions of the sprockets 13 to 20 defines a plurality of teeth, while each of the innermost peripheral portions of the sprockets 13 to 20 define a splined opening having a plurality of freewheel engaging splines. For example, the outermost peripheral portion 13*a* of the third sprocket 13 defines a plurality of third teeth 13*c*, while the innermost peripheral portion 13*b* of the third sprocket 13 defines a splined opening 13*d* having a plurality of freewheel engaging splines.

Figure 7:
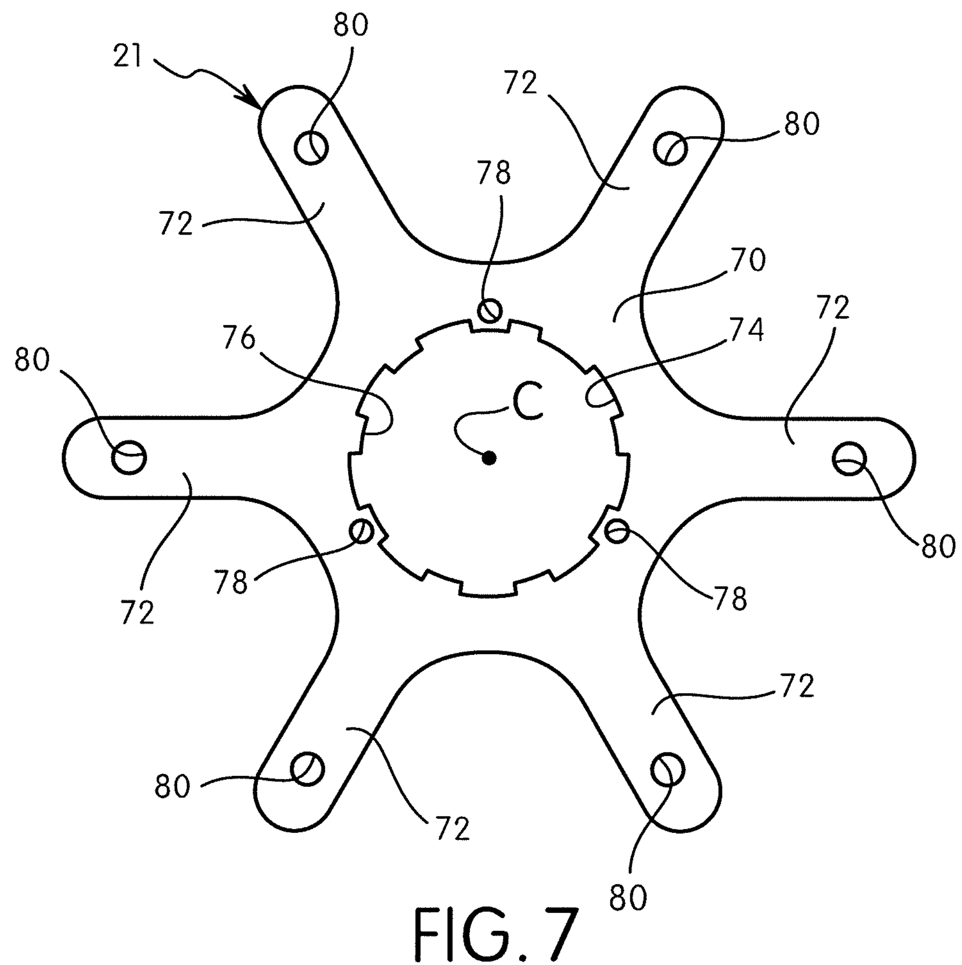
FIG. 7 is a side elevational view of the first axial spacer of the bicycle sprocket assembly illustrated in FIGS. 1 to 4 as viewed from the small sprocket facing side of the first axial spacer.
Figure 8:
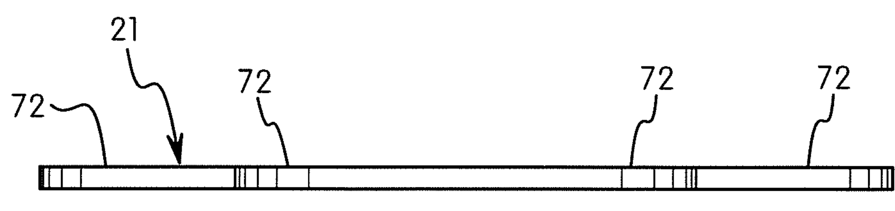
FIG. 8 is an edge elevational view of the first axial spacer of illustrated in FIG. 7.

Referring now to FIGS. 7 and 8, the first axial spacer 21 will now be discussed in more detail. Basically, the first axial spacer 21 includes an innermost peripheral portion 70 and a plurality of radially extending spacer arms 72. In the case of the first axial spacer 21, the spacer arms 72 are preferably integrally formed with the innermost peripheral portion 70 as a one-piece, unitary member. The innermost peripheral portion 70 defines a splined opening 74 having a plurality of freewheel engaging splines 76. Thus, the innermost peripheral portion 70 constitutes a spacer mounting portion. Preferably, the splined opening 74 is configured no that first axial spacer 21 can only fit on the freewheel (not shown) in a single orientation. In other words, the orientation of the first axial spacer 21 is configured and dimensioned such that the first axial spacer 21 has only one proper orientation with respect to the sprockets 11 to 20. The innermost peripheral portion 70 also has a plurality of fastener holes 78 for receiving the inner rivets 31 therethrough, respectively.

In this illustrated embodiment, the total number of the spacer arms 72 of the first axial spacer 21 is equal to a total number of the sprocket arms 62 of the second sprocket 12. Each of the spacer arms 72 has a fastener hole 80 for receiving the outer rivets 32 therethrough, respectively. Thus, the outer rivets 32 extend through the spacer arms 72 of the first axial spacer 21 and the sprocket arms 62 of the second sprocket 12 so that the first sprocket 11 is secured to the first axial spacer 21 and the second sprocket 12.

Figure 9:
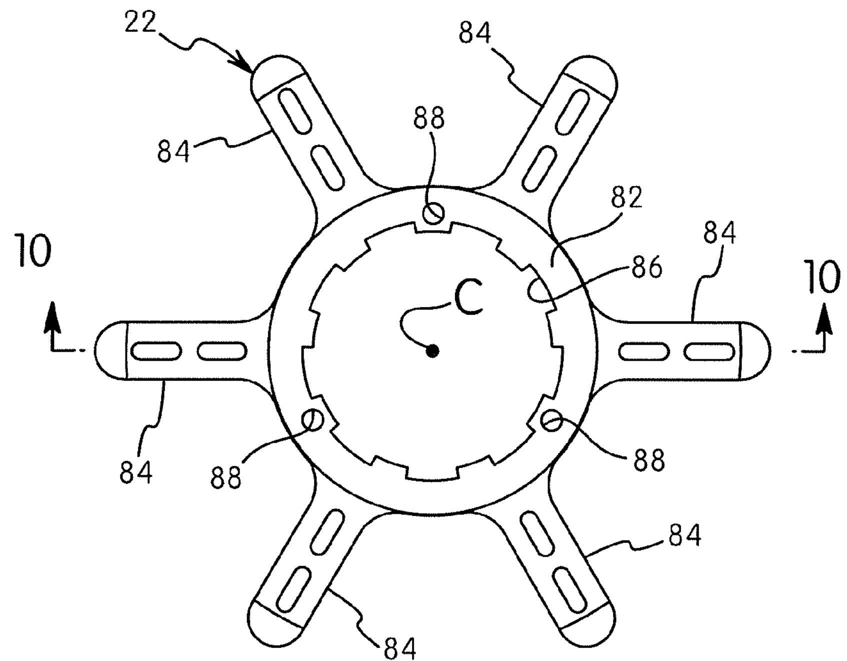
FIG. 9 is a side elevational view of the second axial spacer of the bicycle sprocket assembly illustrated in FIGS. 1 to 4 as viewed from the small sprocket facing side of the second axial spacer.
Figure 10:
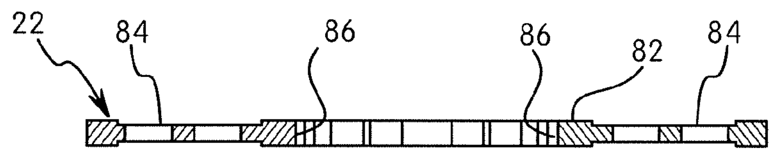
FIG. 10 is a cross sectional view of the second axial spacer illustrated in FIG. 9 as seen along section line 10-10 of FIG. 9.

Referring now to FIGS. 9 and 10, the second axial spacer 22 will now be discussed in more detail. Basically, the second axial spacer 22 includes an innermost peripheral portion 82 and a plurality of radially extending spacer arms 84. In the case of the second axial spacer 22, the spacer arms 84 are preferably integrally formed with the innermost peripheral portion 82 as a one-piece, unitary member. The innermost peripheral portion 82 has a splined opening 86 for mounting on rear hub (not shown) and three fastener receiving holes 88 for receiving the inner rivets 31, respectively. The splined opening 86 is configured to be fixedly mounted on splines of a freewheel (not shown) of a rear hub (not shown) in a relatively conventional manner. Preferably, the splined opening 86 is configured so that second axial spacer 22 can only fit on the freewheel (not shown) in a single orientation. In other words, the orientation of the second axial spacer 22 is configured and dimensioned such that the second axial spacer 22 has only one proper orientation with respect to the sprockets 11 to 20.

In this illustrated embodiment, the total number of the spacer arms 84 of the second axial spacer 22 is equal to a total number of the sprocket arms 62 of the second sprocket 12. Each of the spacer anus 84 has a free end that partially overlaps with the outer rivets 32, respectively. Thus, the second axial spacer 22 is not directly secured to the first and second sprockets 11 and 12 by the outer rivets 32. Rather, the second axial spacer 22 is only directly secured to the first and second sprockets 11 and 12 and the first axial spacer 21 by the inner rivets 31.

Figure 11:
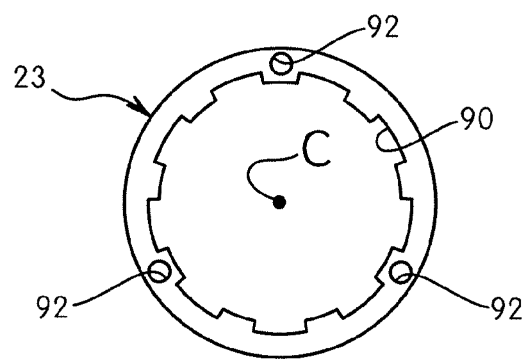
FIG. 11 is a side elevational view of one of the third axial spacers of the bicycle sprocket assembly illustrated in FIGS. 1 to 4 as viewed from the small sprocket facing side of the third axial spacer.

Referring now to FIG. 11, the third axial spacer 23 will now be briefly discussed. Basically, the third axial spacer 23 is a ring shaped member with a splined opening 90 for mounting on rear huh (not shown) and three fastener receiving holes 92 for receiving the inner rivets 31, respectively. The splined opening 90 is configured to be fixedly mounted on splines of a freewheel (not shown) of a rear hub (not shown) in a relatively conventional manner. The axial spacers 24 to 27 are identical to the third axial spacer 23.

Figure 12:
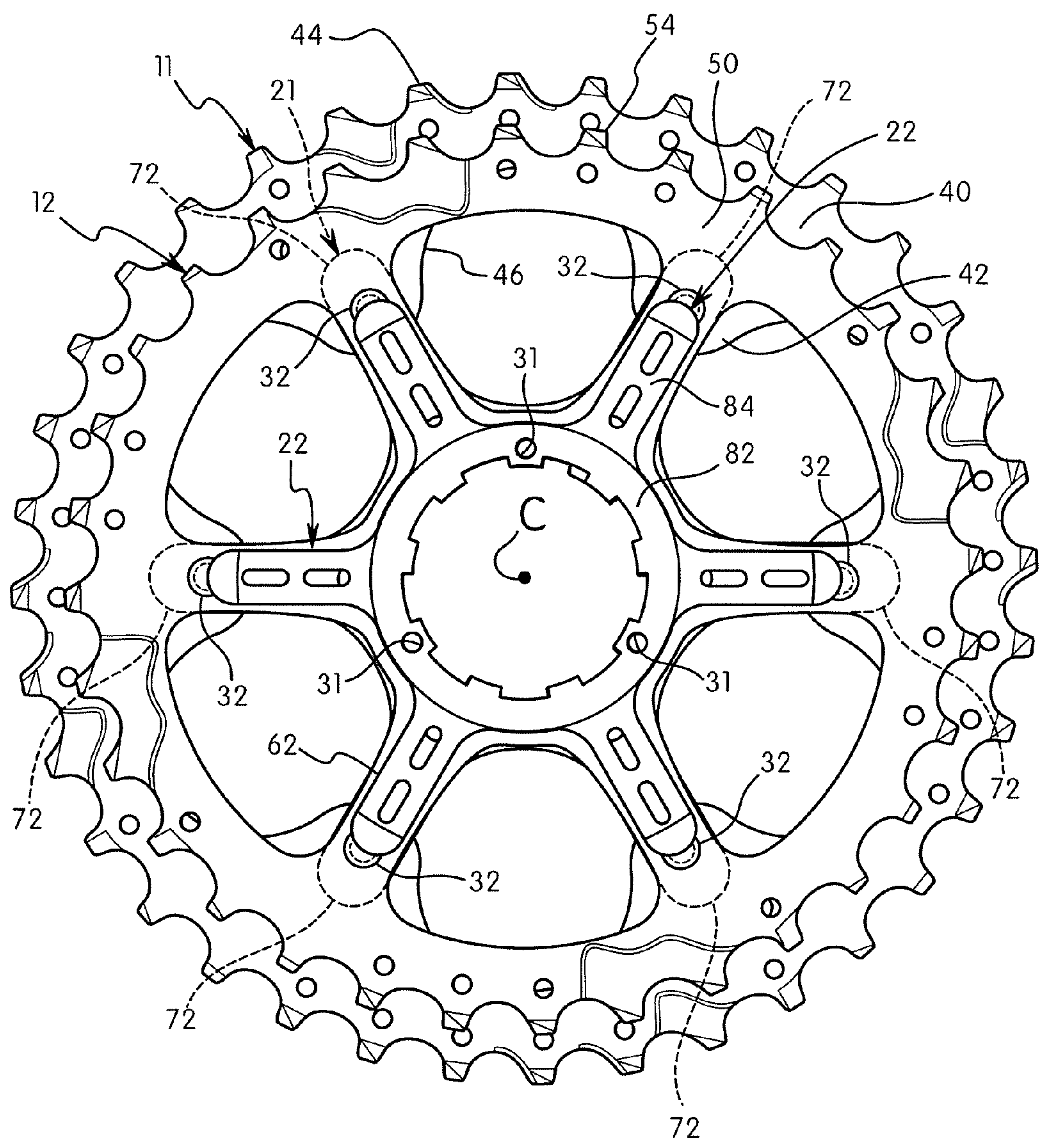
FIG. 12 is a side elevational view of the two largest sprockets and the first and second axial spacers of the bicycle sprocket assembly illustrated in FIGS. 1 to 4 as viewed from the small sprocket facing side of the sprockets.
Figure 13:
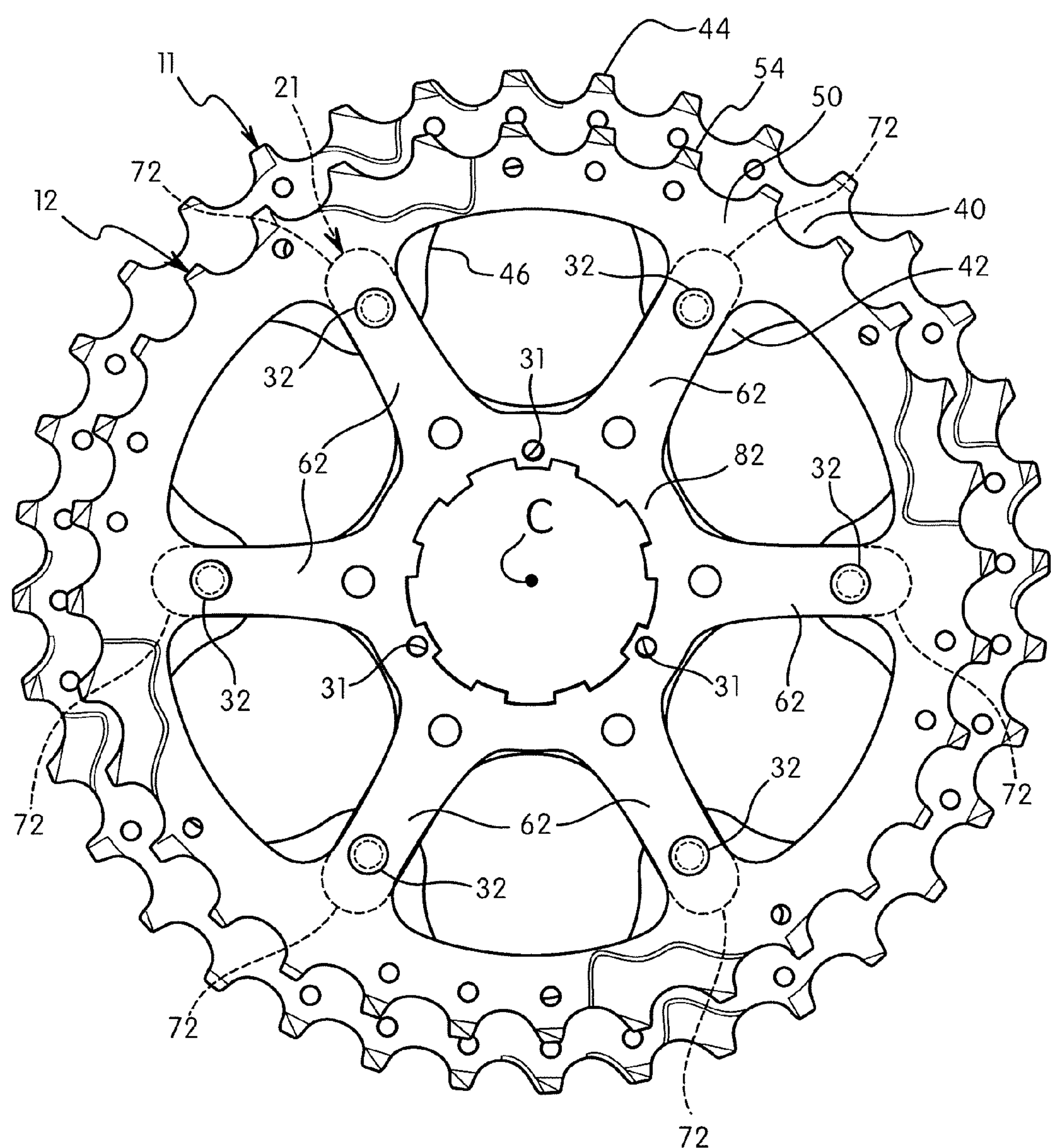
FIG. 13 is a side elevational view of the two largest sprockets and the first axial spacer of the bicycle sprocket assembly illustrated in FIGS. 1 to 4 as viewed from the small sprocket facing side of the sprockets.
Figure 14:
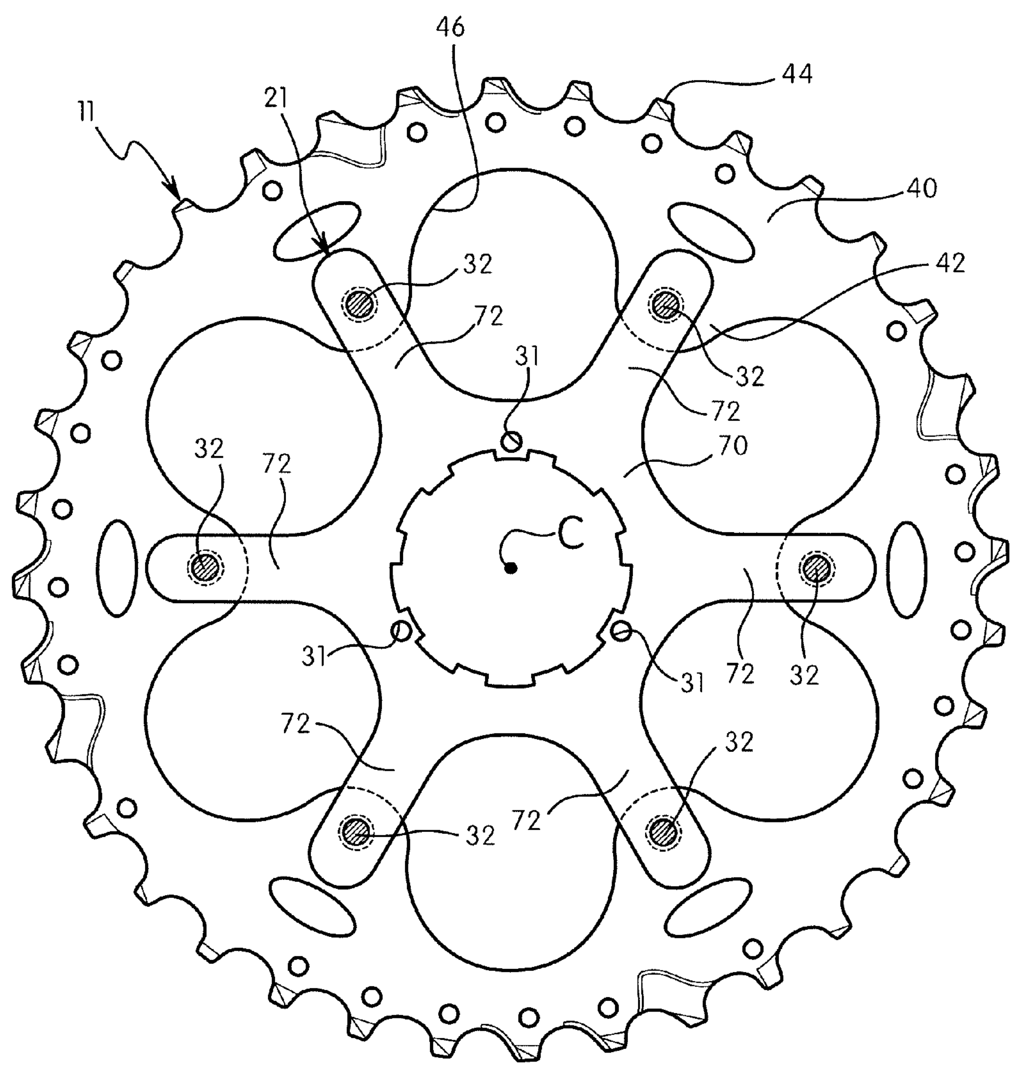
FIG. 14 is a side elevational view of the first or largest sprocket and the first axial spacer of the bicycle sprocket assembly illustrated in FIGS. 1 to 4 as viewed from the small sprocket facing side of the sprocket.

Referring now to FIGS. 12 to 14, the relationship between the first and second sprockets 11 and 12 and the first and second axial spacers 21 and 22 will now be discussed. As seen in FIG. 12, the sprocket arms 62 of the second sprocket 12 are aligned with the spacer arms 72 and 84 of the first and second axial spacers 21 and 22. As seen in FIGS. 13 and 14, the first and second sprockets 11 and 12 and the first axial spacer 21 are secured together as a unit by the outer rivets 32 at six outer attachment points. The first sprocket 11 is supported on a freewheel (not shown) by the innermost peripheral portion 52 of the second sprocket 12 and the innermost peripheral portion 70 of the first axial spacer 21. In this way, the first sprocket 11 can be positioned over an abutment of the freewheel (not shown) that directly contacts the innermost peripheral portion 70 of the first axial spacer 21. Thus, the bicycle sprocket assembly 10 can be used with a conventional nine-speed freewheel.

To better understand the above description of the sprocket assembly 10, some of the terms will now be further explained for the sake of clarity. As used herein, the term "smaller sprocket" refers to a sprocket having a smaller diameter with respect to the claimed sprocket and the term "larger sprocket" refers to a sprocket having a larger diameter with respect to the sprocket in question. As used herein, the term "smaller sprocket facing side surface" refers to a side surface of the sprocket in question that faces a sprocket having a smaller diameter with respect to the sprocket in question and the term "larger sprocket facing side surface" refers to a side surface of the sprocket in question that faces a sprocket having a larger diameter with respect to the sprocket in question. As used herein, the term "adjacent sprocket" refers to an immediate adjacent sprocket to a sprocket in question with no intervening sprockets located between the "adjacent sprocket" and the sprocket in question. The absence of the use of the modifying term "at least one" before another teen should not be construed to preclude additional ones of the modified terms. As used herein, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "fixed" or "secured", as used herein, encompass configurations in which an element is directly secured to another element by affixing the element directly to the other element; configurations in which an element is indirectly secured to another element by affixing the element to intermediate member(s) which in turn are affixed to the other element; and configurations in which one element is integral with another element, i.e. one element is essentially part of the other element. This definition also applies to words of similar meaning, for example the terms "joined" and "attached" and their derivatives. Finally, terms of degree such as "substantially", "about" and "approximately" as used herein mean a reasonable amount of deviation of the modified term such that the end result is not significantly changed.

While only selected embodiments have been chosen to illustrate the sprocket assembly of the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them, unless otherwise specified. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket assembly comprising:

a first sprocket including an outermost peripheral portion defining a plurality of first teeth, and an innermost peripheral portion defining an opening that is free of any freewheel engaging splines, the first sprocket being larger than any other sprocket of the bicycle sprocket assembly;

a second sprocket including an outermost peripheral portion defining a plurality of second teeth, and an innermost peripheral portion defining an opening having a plurality of freewheel engaging splines; and a first axial spacer fixed to the first and second sprockets such that the first axial spacer is disposed between the first and second sprockets without any intervening sprockets disposed between the first and second sprockets, the first axial spacer including an innermost peripheral portion defining an opening having a plurality of freewheel engaging splines, the first axial spacer being fixed to the first and second sprockets at a radial location that is closer to a radially outermost portion of the first axial spacer than to the innermost peripheral portion with respect to a center rotational axis of the bicycle sprocket assembly.

2. The bicycle sprocket assembly according to claim 1, wherein the first axial spacer is fixed to the first and second sprockets by at least one common fastener.

3. The bicycle sprocket assembly according to claim 2, wherein the first axial spacer has a plurality of spacer arms.

4. The bicycle sprocket assembly according to claim 3, wherein the at least one common fastener includes a plurality of individual fasteners that extends through the spacer arms of the first axial spacer.

5. The bicycle sprocket assembly according to claim 3, wherein the second sprocket includes a plurality of sprocket arms, and a total number of the spacer arms of the first axial spacer being equal to a total number of the sprocket arms of the second sprocket.

6. The bicycle sprocket assembly according to claim 5, wherein the at least one common fastener includes a plurality of individual fasteners that extends through the spacer arms of the first axial spacer and the sprocket arms of the second sprocket.

7. The bicycle sprocket assembly according to claim 1, further comprising a third sprocket including an outermost peripheral portion defining a plurality of third teeth, and an innermost peripheral portion defining an opening having a plurality of freewheel engaging splines, the third sprocket being smaller than the second sprocket; and a second axial spacer being disposed between the second and third sprockets without any intervening sprockets disposed between the second and third sprockets.

8. The bicycle sprocket assembly according to claim 7, wherein the second and third sprockets and the first and second axial spacers are fixed together by at least one common fastener that does not fix the first sprocket to the second and third sprockets.

9. The bicycle sprocket assembly according to claim 7, wherein each of the first and second axial spacers has a plurality of spacer arms.

10. The bicycle sprocket assembly according to claim 1, further comprising a plurality of additional sprockets that are smaller than the first and second sprockets, each of the additional sprockets including an outermost peripheral portion defining a plurality of teeth and an innermost peripheral portion defining an opening having a plurality of freewheel engaging splines; and a plurality of additional axial spacers disposed between adjacent ones of the additional sprockets.

11. The bicycle sprocket assembly according to claim 1, wherein the first sprocket is radially straight as the first sprocket extends between the outermost peripheral portion and the innermost peripheral portion.

12. The bicycle sprocket assembly according to claim 3, wherein the plurality of spacer arms extend radially outward from the innermost peripheral portion.

13. The bicycle sprocket assembly according to claim 9, wherein the second axial spacer has an innermost peripheral portion defining an opening having a plurality of freewheel engaging splines, the plurality of spacer arms of the first axial spacer extend radially outward from the innermost peripheral portion of the first axial spacer, and the plurality of spacer arms of the second axial spacer extend radially outward from the innermost peripheral portion of the second axial spacer.

* * * * *